(12) United States Patent
Rho et al.

(10) Patent No.: US 9,284,488 B2
(45) Date of Patent: Mar. 15, 2016

(54) LIQUID CRYSTAL DISPLAY DEVICE

(71) Applicant: Samsung Display Co., Ltd., Yongin (KR)

(72) Inventors: Soon Joon Rho, Suwon-si (KR); Jin-Lak Kim, Osan-si (KR); Kyungmin Kim, Seoul (KR); Hyelim Jang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/226,648

(22) Filed: Mar. 26, 2014

(65) Prior Publication Data

US 2015/0062514 A1 Mar. 5, 2015

(30) Foreign Application Priority Data

Sep. 5, 2013 (KR) .......................... 10-2013-0106787

(51) Int. Cl.
| | |
|---|---|
| *C09K 19/00* | (2006.01) |
| *C09K 19/32* | (2006.01) |
| *C09K 19/20* | (2006.01) |
| *C09K 19/04* | (2006.01) |
| *C09K 19/12* | (2006.01) |
| *C09K 19/30* | (2006.01) |

(52) U.S. Cl.
CPC .............. *C09K 19/32* (2013.01); *C09K 19/2014* (2013.01); *C09K 2019/0448* (2013.01); *C09K 2019/122* (2013.01); *C09K 2019/123* (2013.01); *C09K 2019/3004* (2013.01)

(58) Field of Classification Search
CPC .... C09K 19/00; C09K 19/32; C09K 19/2014; C09K 19/2019; C09K 19/0448; C09K 19/122; C09K 19/123; C09K 19/3004

USPC ........... 349/123, 127, 132, 182; 428/1.1, 1.2, 428/1.3

See application file for complete search history.

(56) References Cited

U.S. PATENT DOCUMENTS

| | | | |
|---|---|---|---|
| 8,318,270 B2 * | 11/2012 | Seong et al. .................... | 428/1.1 |
| 8,858,829 B2 * | 10/2014 | Okamoto et al. .......... | 252/299.6 |
| 2012/0162595 A1 | 6/2012 | Lee et al. | |
| 2012/0224124 A1 | 9/2012 | Goetz et al. | |
| 2012/0268706 A1 | 10/2012 | Goebel et al. | |
| 2013/0092875 A1 | 4/2013 | Okamoto et al. | |

FOREIGN PATENT DOCUMENTS

| | | |
|---|---|---|
| JP | 2012-001623 | 1/2012 |
| JP | 2012-018215 | 1/2012 |
| JP | 2012-067236 | 4/2012 |
| JP | 2012-158626 | 8/2012 |
| JP | 2012-180284 | 9/2012 |
| JP | 2012-241124 | 12/2012 |
| KR | 10-2010-0059916 | 6/2010 |
| KR | 10-2011-0039477 | 4/2011 |
| WO | 2009/030318 | 3/2009 |
| WO | 2010/012363 | 2/2010 |

* cited by examiner

*Primary Examiner* — Geraldina Visconti
(74) *Attorney, Agent, or Firm* — H.C. Park & Associates, PLC

(57) ABSTRACT

The present disclosure relates to a liquid crystal display device including a first substrate including a first base substrate and a first alignment layer provided on the first base substrate, a second substrate including a second base substrate facing the first base substrate and a second alignment layer provided on the second base substrate. The device further includes a liquid crystal layer provided between the first substrate and the second substrate and including a liquid crystal composition. The liquid crystal layer may include a bicyclohexane liquid crystal compound and an alkenyl liquid crystal compound.

14 Claims, 4 Drawing Sheets

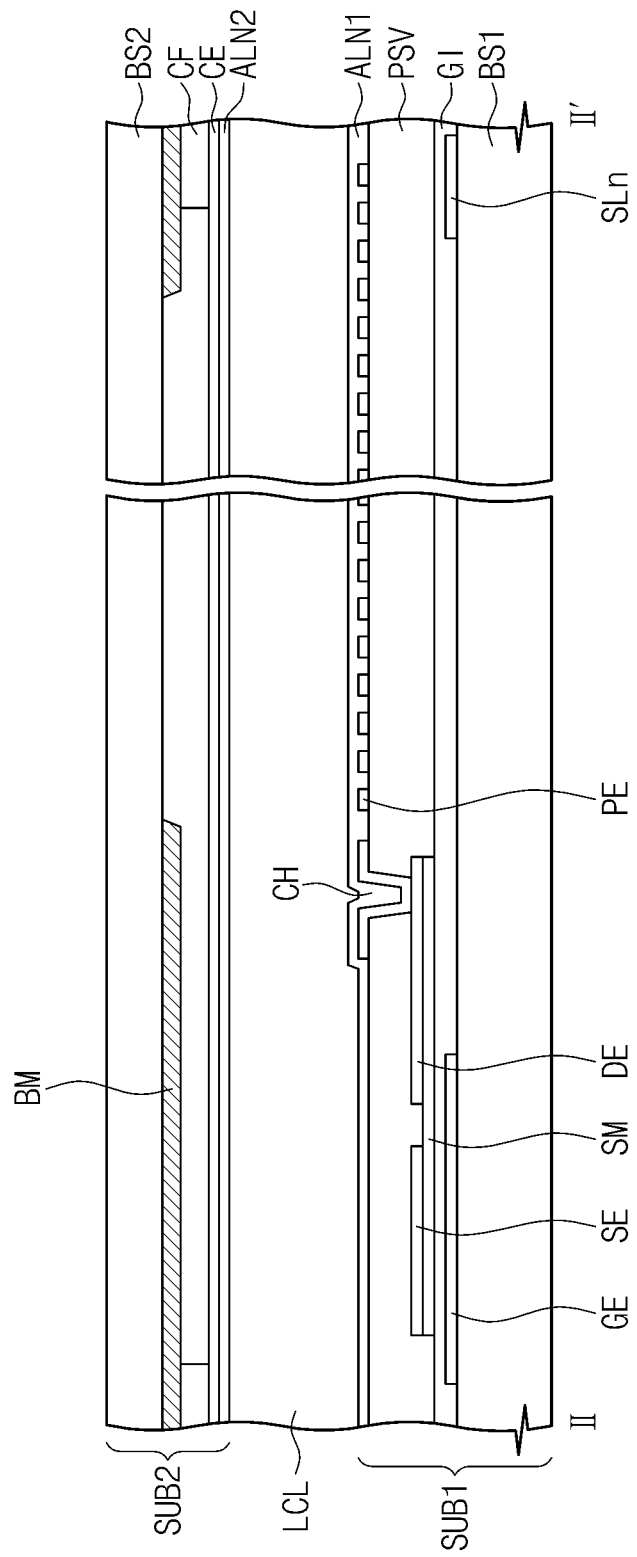

LIQUID CRYSTAL DISPLAY DEVICE

CROSS REFERENCE TO RELATED APPLICATIONS

This application claims priority from and the benefit of Korean Patent Application No. 10-2013-0106787, filed on Sep. 5, 2013, which is hereby incorporated by reference for all purposes as if fully set forth herein.

BACKGROUND

1. Field

Exemplary embodiments of the present disclosure relate to a liquid crystal display device including liquid crystals having low viscosity.

2. Discussion

A liquid crystal display device may include a first substrate including a plurality of pixel electrodes, a second substrate including a common electrode, and a liquid crystal layer disposed between the first substrate and the second substrate. The liquid crystal display device displays an image by changing the light transmittance of the liquid crystal layer according to an electric field formed between each of the pixel electrodes and the common electrode. The liquid crystal display device includes a plurality of pixels, each of which includes the pixel electrode.

Recently, liquid crystal display devices providing large amounts of image information to a user and displaying a three-dimensional image as well as a two-dimensional image are being developed. Thus, there is a need to drive pixels more rapidly.

The above information disclosed in this background section is only for enhancement of understanding of the background of the disclosed subject matter and therefore may contain information that does not form any part of the prior art nor what the prior art may suggest to a person of ordinary skill in the art.

SUMMARY

Exemplary embodiments of the present disclosure provide a liquid crystal display device having decreased defects and a rapid response time.

Additional features of the present disclosure will be set forth in the description which follows, and in part will be apparent from the description, or may be learned by practice of the disclosed subject matter.

Exemplary embodiments of the present disclosure provide a liquid crystal display device including a first substrate, a second substrate, and a liquid crystal layer. The first substrate includes a first base substrate and a first alignment layer disposed on the first base substrate. The second substrate includes a second base substrate facing the first base substrate, and a second alignment layer disposed on the second base substrate. The liquid crystal layer is disposed between the first substrate and the second substrate and includes a liquid crystal composition. The liquid crystal composition includes a first liquid crystal compound and a second liquid crystal compound. The first liquid crystal compound includes at least one compound selected from the group represented by Chemical Formula 1, and the second liquid crystal compound includes at least one compound selected from the group represented by Chemical Formula 2. Each of the first alignment layer and the second alignment layer includes at least one reactive mesogen selected from the group represented by Chemical Formula 3 and at least one difluoro terphenyl compound selected from the group represented by Chemical Formula 4, or a polymerization product thereof.

Chemical Formula 1 comprises:

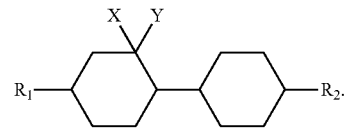

Chemical Formula 2 comprises:

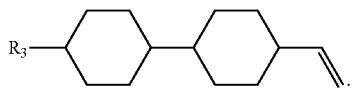

Chemical Formula 3 comprises:

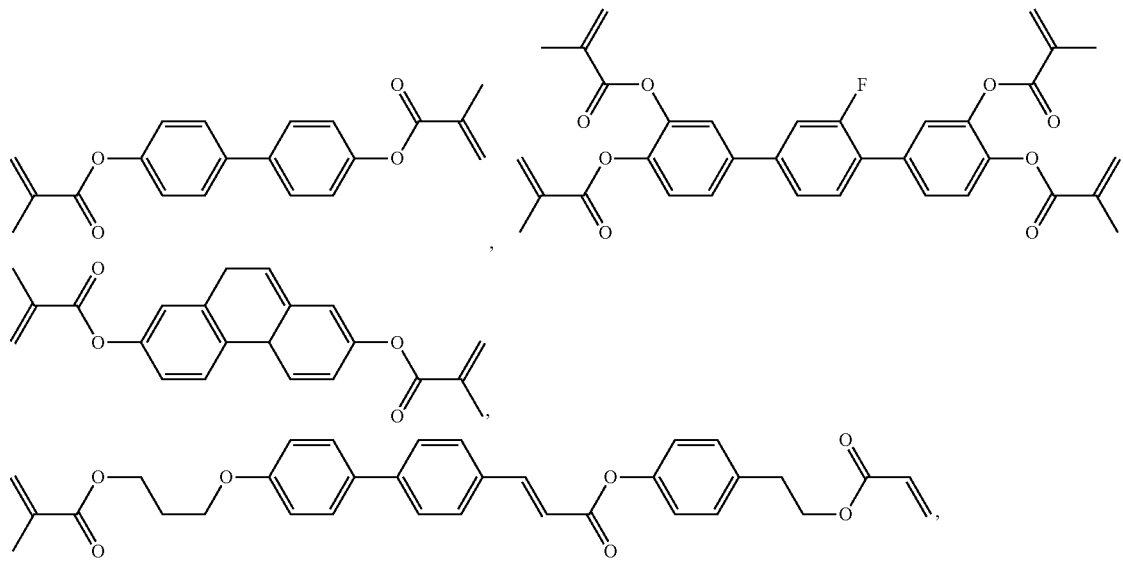

-continued

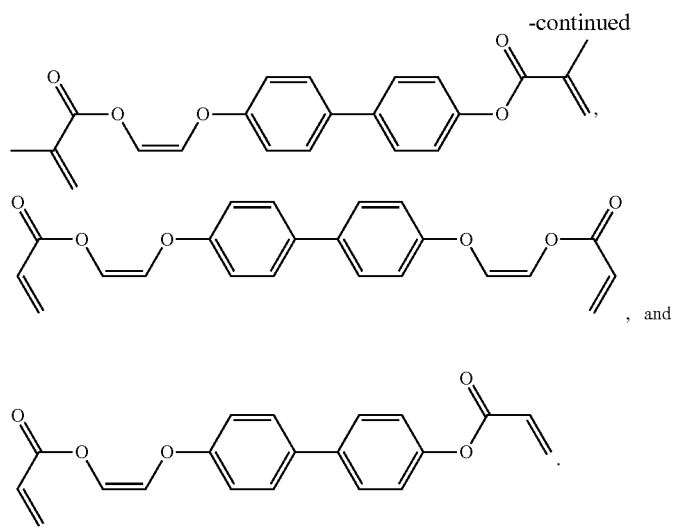
, and

Chemical Formula 4 comprises:

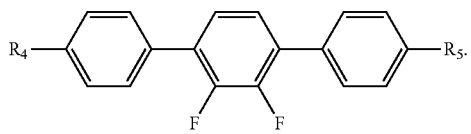

Substituents $R_1$ and $R_2$ represent R—, ROCO—, or RCOO—. R includes an alkyl group having 1 to 15 carbon atoms. The alkyl group includes an unsaturated or saturated bond, and —$CH_2$— in the alkyl group is substituted or unsubstituted with —O—, —CO—, or —COO—. X and Y independently represent a halogen atom or a hydrogen atom, and do not represent the hydrogen atom at the same time. $R_3$, $R_4$, and $R_5$ independently represent an alkyl group, an alkenyl group, or an alkoxy group having 2 to 5 carbon atoms.

According to exemplary embodiments of the present disclosure a liquid crystal display device includes a first substrate, a second substrate, and a liquid crystal layer. The first substrate includes a first base substrate, a common electrode disposed on the first base substrate, and a pixel electrode insulated from the common electrode. The second substrate faces the first substrate. The liquid crystal layer is disposed between the first substrate and the second substrate. The liquid crystal layer includes a liquid crystal composition. The liquid crystal composition includes a first liquid crystal compound and a second liquid crystal compound. The first liquid crystal compound includes at least one selected from the group represented by Chemical Formula 1, and the second liquid crystal compound includes at least one selected from the group represented by Chemical Formula 2. A sum of the first liquid crystal compound and the second liquid crystal compound is above 0 to about 60 parts by weight based on 100 parts by weight of a total liquid crystal composition.

Chemical Formula 1 comprises:

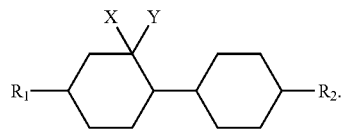

Chemical Formula 2 comprises:

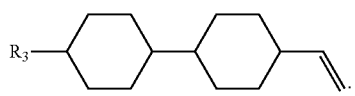

Substituents $R_1$ and $R_2$ represent R—, ROCO—, or RCOO—. R includes an alkyl group having 1 to 15 carbon atoms. The alkyl group includes an unsaturated or saturated bond, and —$CH_2$— in the alkyl group is substituted or unsubstituted with —O—, —CO—, or —COO—. X and Y independently represent a halogen atom or a hydrogen atom, and X and Y do not represent the hydrogen atom at the same time. $R_3$ represents an alkyl group, an alkenyl group, or an alkoxy group having 2 to 5 carbon atoms.

It is to be understood that both the foregoing general description and the following detailed description are exemplary and explanatory and are intended to provide further explanation of the disclosed subject matter as claimed.

BRIEF DESCRIPTION OF THE DRAWINGS

The accompanying drawings, which are included to provide a further understanding of the disclosed subject matter and are incorporated in and constitute a part of this specification, illustrate embodiments of the disclosed subject matter, and together with the description serve to explain the principles of the disclosed subject matter.

FIG. 4 is a cross-sectional view of a portion of a liquid crystal display device taken along a line II-II' in FIG. 3 according to exemplary embodiments of the present disclosure.

DETAILED DESCRIPTION OF THE ILLUSTRATED EMBODIMENTS

Figure 1:
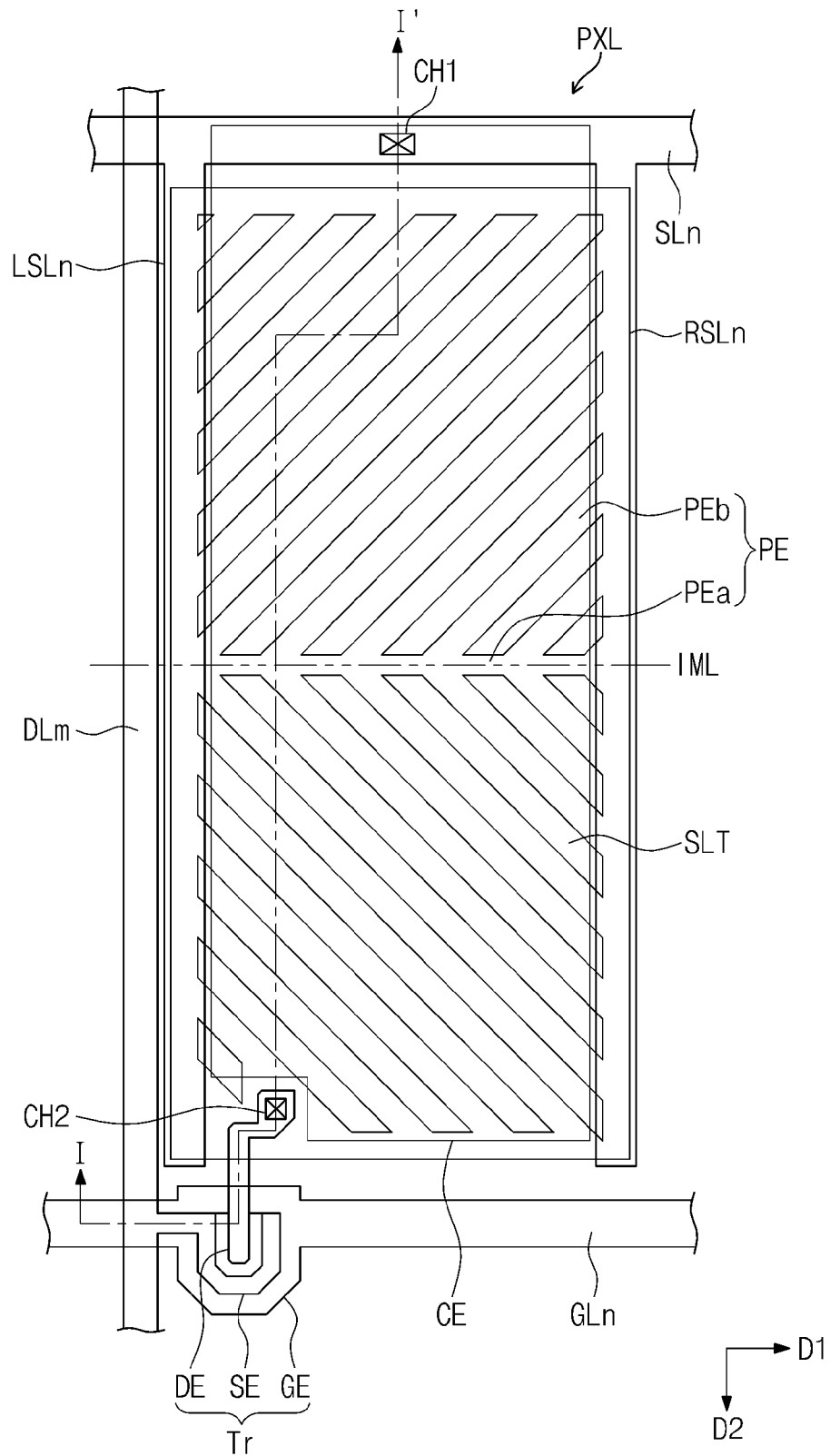
FIG. 1 is a plan view of a liquid crystal display device according to exemplary embodiments of the present disclosure.

Exemplary embodiments of the disclosed subject matter are described more fully hereinafter with reference to the accompanying drawings. The disclosed subject matter may, however, be embodied in different forms and should not be construed as limited to the exemplary embodiments set forth herein. Rather, the exemplary embodiments are provided so that this disclosure is thorough and complete, and will convey the scope of the disclosed subject matter to those skilled in the art. In the drawings, the size and relative sizes of layers and regions may be exaggerated for clarity. Like reference numerals in the drawings denote like elements.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present. As used herein, the term "and/or" includes any and all combinations of one or more of the associated listed items. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments of the present disclosure.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an", and "the" are intended to include the plural forms as well, unless the context clearly indicates otherwise.

Exemplary embodiments of the disclosed subject matter are described herein with reference to cross-sectional illustrations that are schematic illustrations of idealized embodiments (and intermediate structures) of the disclosed subject matter. As such, variations from the shapes of the illustrations as a result, for example, of manufacturing techniques and/or tolerances, are to be expected. Thus, exemplary embodiments of the disclosed subject matter should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be further understood that the terms "comprises" and/or "comprising," when used in this specification, specify the presence of stated features, numerals, steps, operations, components, parts or combinations thereof, but do not preclude the presence or addition of one or more other features, numerals, steps, operations, components, parts or combinations thereof.

Hereinafter, exemplary embodiments of the present disclosure will be described in detail with reference to the accompanying drawings.

Figure 2:
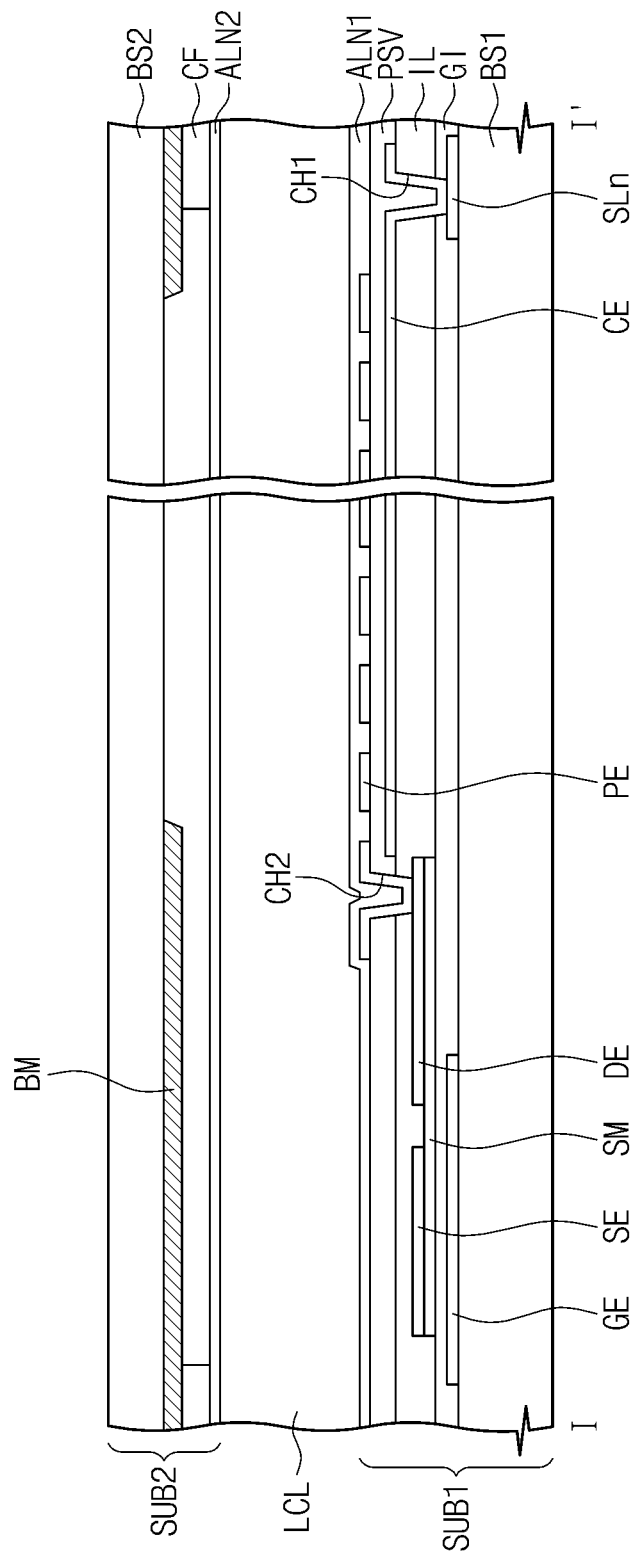
FIG. 2 is a cross-sectional view taken along a line I-I' in FIG. 1 according to exemplary embodiments of the present disclosure.

FIG. 1 is a plan view of a liquid crystal display device according to exemplary embodiments of the present disclosure, and FIG. 2 is a cross-sectional view taken along a line I-I' in FIG. 1.

Referring to FIGS. 1 and 2, a liquid crystal display device may include a first substrate SUB1, a second substrate SUB2 facing the first substrate SUB1, and a liquid crystal layer LCL disposed between the first substrate SUB1 and the second substrate SUB2.

The first substrate SUB1 may include a first base substrate BS1, a plurality of gate lines GLn (n being any whole number greater than 1), a plurality of data lines DLm (m being any whole number greater than 1), a plurality of pixels PXL, and a first alignment layer ALN1.

The first substrate SUB1 may include a plurality of pixel areas arranged in a matrix shape, and each of the plurality of pixels may correspond to each of the pixel areas. For convenience of explanation, one pixel area including an n-th gate line GLn among the plurality of gate lines, an m-th data line DLm among the plurality of data lines, and one pixel, is illustrated in FIGS. 1 and 2. However, the rest of the pixels may have similar structure in the liquid crystal display device according to exemplary embodiments. Hereinafter, the n-th gate line GLn and the m-th data line DLm will be respectively referred to as a gate line and a data line.

The gate line GLn may be formed on the first base substrate BS1 and may extend in a first direction D1. The data line DLm may extend in a second direction D2 crossing (e.g., approximately perpendicular to) the first direction D1. A gate insulating layer GI may be formed between the data line DLm and the gate line GLn. The gate insulating layer GI may be provided on the entire surface of the first base substrate BS1 and may cover the gate line GLn.

Each of the pixels PXL may be connected to a corresponding gate line GLn among the gate lines, and to a corresponding data line DLm among the data lines.

Each of the pixels PXL may include a thin film transistor Tr, a pixel electrode PE connected to the thin film transistor Tr, a common electrode CE insulated from the pixel electrode PE, and a storage electrode part.

The thin film transistor Tr may include a gate electrode GE, a gate insulating layer GI, a semiconductor pattern SM, a source electrode SE, and a drain electrode DE.

The gate electrode GE may be extruded from the gate line GLn or may be provided on a portion of the gate line GLn.

The gate electrode GE may be formed by using a metal. The gate electrode GE may be formed by using nickel, chromium, molybdenum, aluminum, titanium, copper, tungsten, and an alloy thereof. The gate electrode GE may be formed as a single layer or a multi-layer using the metal. For example, the gate electrode GE may be a triple layer obtained by stacking molybdenum, aluminum, and molybdenum one by one, or a double layer obtained by stacking titanium and copper one by one. In some cases, the gate electrode GE may be a single layer formed by using an alloy of titanium and copper.

The semiconductor pattern SM may be provided on the gate insulating layer GI. The semiconductor layer SM may be provided on the gate electrode GE with the gate insulating layer GI formed therebetween. A portion of the semiconductor pattern SM may overlap with the gate electrode GE. The semiconductor pattern SM may include an active pattern (not illustrated) provided on the gate insulating layer GI, and an ohmic contact layer (not illustrated) formed on the active pattern. The active pattern may be formed by using amorphous silicon, and the ohmic contact layer may be formed as a thin film of n+ amorphous silicon. The ohmic contact layer may make an ohmic contact between the active pattern and the source electrode SE and the drain electrode DE, respectively.

The source electrode SE may be branched from the data line DLm. The source electrode SE may be formed on the ohmic contact layer, and a portion of the source electrode SE may overlap with the gate electrode GE.

The drain electrode DE may be disposed apart from the source electrode SE with the semiconductor pattern SM disposed therebetween. The drain electrode DE may be formed on the ohmic contact layer, and a portion of the drain electrode DE may be disposed to overlap with the gate electrode GE.

The source electrode SE and the drain electrode DE may be formed by using nickel, chromium, molybdenum, aluminum, titanium, copper, tungsten, and an alloy thereof. The source electrode SE and the drain electrode DE may be formed as a single layer or a multi-layer using the metal. For example, the source electrode SE and the drain electrode DE may be a double layer obtained by stacking titanium and copper one by one. In some cases, the source electrode SE and the drain electrode DE may be a single layer formed by using an alloy of titanium and copper.

The upper surface of the active pattern between the source electrode SE and the drain electrode DE may be exposed, and may be a channel part making a conductive channel between the source electrode SE and the drain electrode DE according to the application of the voltage of the gate electrode GE. The source electrode SE and the drain electrode DE overlap with a portion of the semiconductor layer SM excluding the channel part formed between the separated portion of the source electrode SE and the drain electrode DE.

On the thin film transistor Tr, an interlayer IL is provided. The interlayer IL covers the source electrode SE, the drain electrode DE, the channel part, and the gate insulating layer GI. The interlayer IL is formed by using an insulating material.

The common electrode CE is provided on the interlayer IL. The common electrode CE has an approximately rectangular shape from a plan view. However, the shape of the common electrode CE is not limited thereto, and various shapes may be obtained according to the shape of each pixel PXL. The common electrode CE may be formed as one plate without including a pattern such as slits.

The common electrode CE may be formed by using a transparent conductive material. The common electrode CE may be formed by using a conductive metal oxide such as indium tin oxide (ITO), indium zinc oxide (IZO), indium tin zinc oxide (ITZO), or the like.

The storage electrode part may overlap the common electrode CE and may form a storage capacitor. The storage electrode part may be formed on the first base substrate BS1 and may extend in the first direction D1. The storage electrode part may be separated from the gate line GLn from a plan view. The storage electrode part may further include a storage line SLn extended in the first direction D1, and first and second branch electrodes LSLn and RSLn branched from the storage line SLn and extended in the second direction D2. The storage line SLn may be formed by using the same material as the gate line GL, and may be formed by conducting a single patterning process along with the gate line GL.

A first contact hole CH1 exposing the storage electrode part, particularly, a portion of the storage line SLn, may be formed in the gate insulating layer GI and the interlayer IL through partially removing the gate insulating layer GI and the interlayer IL. The common electrode CE may be connected to the storage electrode part through the first contact hole CH1. Thus, common voltage having the same level is applied to the storage line SLn and the common electrode CE. Since the common voltage is applied to the common electrode CE of each pixel through the storage line SLn, voltage having a uniform level may be applied to the common electrode CE without inducing voltage drop over an entire display area.

On the interlayer IL and the common electrode CE, a passivation layer PSV may be provided. The passivation layer PSV may be formed by using an insulating material such as an organic insulating material or an inorganic insulating material.

On the passivation layer PSV, a pixel electrode PE may be provided.

The pixel electrode PE may partially overlap with the common electrode CE from a plan view, and may form an electric field (for example, a fringe electric field) with the common electrode CE.

The pixel electrode PE may include a plurality of slits SLT formed by removing a portion of the pixel electrode PE. The slits SLT may be provided in a slanted direction with respect to the first direction D1 or the second direction D2. In addition, the pixel electrode PE may have a plurality of areas formed by the slits SLT having different slanted directions from each other. The plurality of areas may be substantially line symmetric with respect to an imaginary line IML crossing the pixel PXL, or may be substantially point symmetric with respect to a point in the pixel PXL. In FIG. 1, the slits SLT are formed to have the line symmetric shape with respect to the imaginary line IML crossing the pixel PXL in the first direction D1 as an embodiment.

The pixel electrode PE may include a stem part PEa formed in each pixel, and a plurality of branch parts PEb divided by the slits LST, and may extrude and extend from the stem part PEa. The branch parts PEb are separated by a certain distance from each other. The branch parts PEb of the pixel electrode PE may form an electric field with the common electrode CE.

The branch parts PEb may extend in a certain direction (e.g., approximately 45° to the first direction D1) and may be in parallel to each other. The stem part PEb and the branch parts PEb may be provided in various shapes. For example, the branch parts PEb may be extruded and may extend in various directions relative to the extended direction of the stem part PEa. The stem part PEa may be formed to have a shape bent one or more times.

The pixel electrode PE may be formed by using a transparent conductive material. The pixel electrode PE may be formed by using a conductive metal oxide such as ITO, IZO, ITZO, or the like.

The interlayer IL and the passivation layer PSV are partially removed to form a second contact hole CH2 exposing a portion of the drain electrode DE. The pixel electrode PE is connected to the drain electrode DE through the second contact hole CH2.

The pixel electrode PE may partially overlap with the storage line SLn and the first and second branch electrodes LSLn and RSLn to form a storage capacitor.

The first alignment layer ALN1 may be disposed on the first base substrate SUB1 including the pixel electrode PE formed thereon, and may align liquid crystal molecules in the liquid crystal layer LCL.

The first alignment layer ALN1 may include an organic polymer, for example, a polymer such as polyimide, polyamic acid, polyamide, polyamic imide, polyester, polyethylene, polyurethane, and polystyrene, or a mixture thereof.

The second base substrate SUB2 may include a second base substrate BS2, color filters CF, a black matrix BM, and a second alignment layer ALN2.

The color filters CF may be formed to impart the light penetrating the liquid crystal layer LCL with color. The color filters CF may include a red color filter, a green color filter, and a blue color filter. The red color filter, the green color filter, or the blue color filter making one to one correspondence to each pixel PXL may be disposed. The black matrix BM is disposed to block the light leaked out between neighboring pixels.

The second alignment layer ALN2 is disposed on the color filter CF, and aligns the liquid crystal molecules in the liquid crystal layer LCL along with the first alignment layer ALN1. The material of the second alignment layer ALN2 may be the same as or different from that of the first alignment layer ALN1.

Between the first substrate SUB1 and the second substrate SUB2, the liquid crystal layer LCL including the liquid crystal molecules may be provided.

The liquid crystal layer LCL may include a liquid crystal composition including at least two kinds of liquid crystal compounds. The dielectric anisotropy of the liquid crystal composition may be negative or positive. The liquid crystal composition may include from above 0 to 60 parts by weight of a liquid crystal compound represented by Chemical Formula 1 and a liquid crystal compound represented by Chemical Formula 2 based on 100 parts by weight of the total amount of the liquid crystal composition.

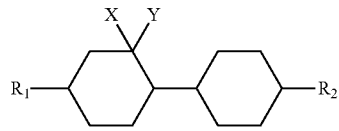

[Chemical Formula 1]

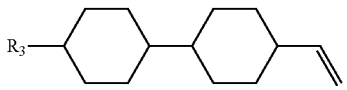

[Chemical Formula 2]

$R_1$ and $R_2$ may be the same or different groups and may represent R—, ROCO—, or RCOO—, where R is an alkyl group having 1 to 15 carbon atoms. The alkyl group may optionally include an unsaturated bond, and —$CH_2$— in the alkyl group may be substituted or unsubstituted with —O—, —CO—, or —COO—.

In Chemical Formula 1, substituents X and Y independently represent a halogen atom or a hydrogen atom, but cannot both represent the hydrogen atom at the same time.

In the Formula 2, $R_3$ may be an alkyl group, an alkenyl group, or an alkoxy group having 2 to 5 carbon atoms.

The liquid crystal display device having the above-described structure according to exemplary embodiments of the present disclosure may be manufactured by forming the first substrate through forming gate lines, data lines, pixels, and a first alignment layer on a first base substrate, forming a second substrate through forming a second alignment layer on a second base substrate, dropping liquid crystal between the first substrate and the second substrate, and combining the first base substrate and the second base substrate. The procedure will be described in detail referring to FIGS. 1 and 2.

A gate pattern may be formed on the first base substrate BS1. The gate pattern may include the gate line GLn and a storage electrode part. The gate pattern may be formed by a photolithography process.

On the gate pattern, a gate insulating layer GI may be formed.

On the gate insulating layer GI, a semiconductor layer SM may be formed. The semiconductor layer SM may include an active pattern and an ohmic contact layer formed on the active pattern. The semiconductor layer SM may be formed by using a photolithography process.

On the semiconductor layer SM, a data pattern may be formed. The data pattern may include the data line DLm, the source electrode SE, and the drain electrode DE. The data pattern may be formed by using a photolithography process. The semiconductor layer SM and the data pattern may be formed by using one half mask or one diffraction mask.

On the data pattern, an interlayer IL may be formed. A first contact hole CH1 may be formed through interlayer IL exposing a portion of the storage electrode part. The interlayer IL may be formed by using a photolithography process.

On the interlayer IL, a common electrode CE may be formed. The common electrode CE may be formed by using a photolithography process, and may be connected to the storage electrode part through the first contact hole CH1.

On the common electrode CE, a passivation layer PSV may be formed.

A second contact hole CH2 may be formed through the passivation layer PSV and the interlayer IL exposing a portion of the drain electrode DE, and the second contact hole CH2 may be formed by using a photolithography process.

On the passivation layer PSV, a pixel electrode PE connected to the drain electrode DE through the second contact hole CH2 may be formed. The pixel electrode PE may be formed by using a photolithography process.

Then, a first alignment layer ALN1 may be formed on the first substrate SUB1 including the pixel electrode PE formed thereon. The first alignment layer ALN1 may be formed by coating a first aligning solution on the first substrate SUB1 and removing solvents from the first aligning solution.

On the second base substrate BS2, a color filter CF providing color and a black matrix may be formed. The color filter CF may be formed by means of various methods and, in some cases, may be formed by using a photolithography process. The black matrix BM may be disposed to block the light leaked out between neighboring pixels. A second alignment layer ALN2 may be formed on the second substrate SUB2 including the color filter CF formed thereon. The second alignment layer ALN2 may be formed by substantially the same method as the method of forming the first alignment layer ALN1. The material of the second alignment layer ALN2 may be the same as or different from that the material of the first alignment layer ALN1.

The first substrate SUB1 and the second substrate SUB2 may face each other and a liquid crystal layer LCL may be formed between the first substrate SUB1 and the second substrate SUB2.

The liquid crystal display device may be driven by a plane-to-line switching (PLS) mode. If a gate signal is applied to an n-th gate line GLn, a thin film transistor Tr may be turned-on. A data signal applied to an m-th data line DLm is applied to the pixel electrode PE via the thin film transistor Tr. If the thin film transistor Tr is turned-on and the data signal is applied to the pixel electrode PE, an electric field may be formed between the pixel electrode PE and the common electrode CE. The voltage applied to the pixel electrode PE may be greater or smaller than the voltage applied to the common electrode CE. For example, the voltage of 0 V may be applied to the common electrode CE, and the voltage of 7 V may be applied to the pixel electrode PE. The electric field formed by the difference between the voltages applied to the common electrode CE and the pixel electrode PE may drive the liquid crystal molecules. Accordingly, the amount of light penetrating the liquid crystal layer may be changed, and an image may be displayed.

In some cases, the pixel electrode PE may be formed as one plate, and the common electrode CE including a plurality of slits may be formed on the pixel electrode PE. However, the present disclosure is not limited thereto. In some cases, a plurality of slits may be formed in the pixel electrode PE, and in this case, the pixel electrode PE may be provided on the common electrode CE, as shown in FIG. 2. When the pixel electrode PE includes a plurality of slits, the pixel electrode PE may also include branch parts. The branch parts of the pixel electrode PE may be alternately disposed with the branch parts of the common electrode CE on a plane to attain an operation of in plane switching (IPS) mode.

If the liquid crystal display device is driven by a PLS mode or an IPS mode as described above, the liquid crystal compound of Chemical Formula 2 may be an alkenyl-based liquid crystal compound, which has relatively low rotational viscosity when compared with a liquid crystal compound having another functional group. Therefore, as the amount of the alkenyl-based liquid crystal compound of Chemical Formula 2 is increased, the response time of a total liquid crystal composition may be increased. If the amount of the alkenyl-based liquid crystal compound of Chemical Formula 2 is excessively large, defects may be generated due to the large reactivity of a carbon double bond portion. According to exemplary embodiments of the present disclosure, a cyclohexane-based liquid crystal compound of Chemical Formula 1, which does not contain the carbon double bond part, may be used. The rotational viscosity of the total liquid crystal composition may be maintained and the side reaction due to the double bond part of the alkenyl-based liquid crystal compound may be prevented. Thus, a rapid response time of a pixel may be accomplished by using the low viscosity properties of the liquid crystal compounds in the liquid crystal display device according to exemplary embodiments of the present disclosure.

According to exemplary embodiments of the present disclosure, the liquid crystal display device may be driven by other modes other than the PLS mode or the IPS mode within the scope of the present disclosure.

Figure 3:
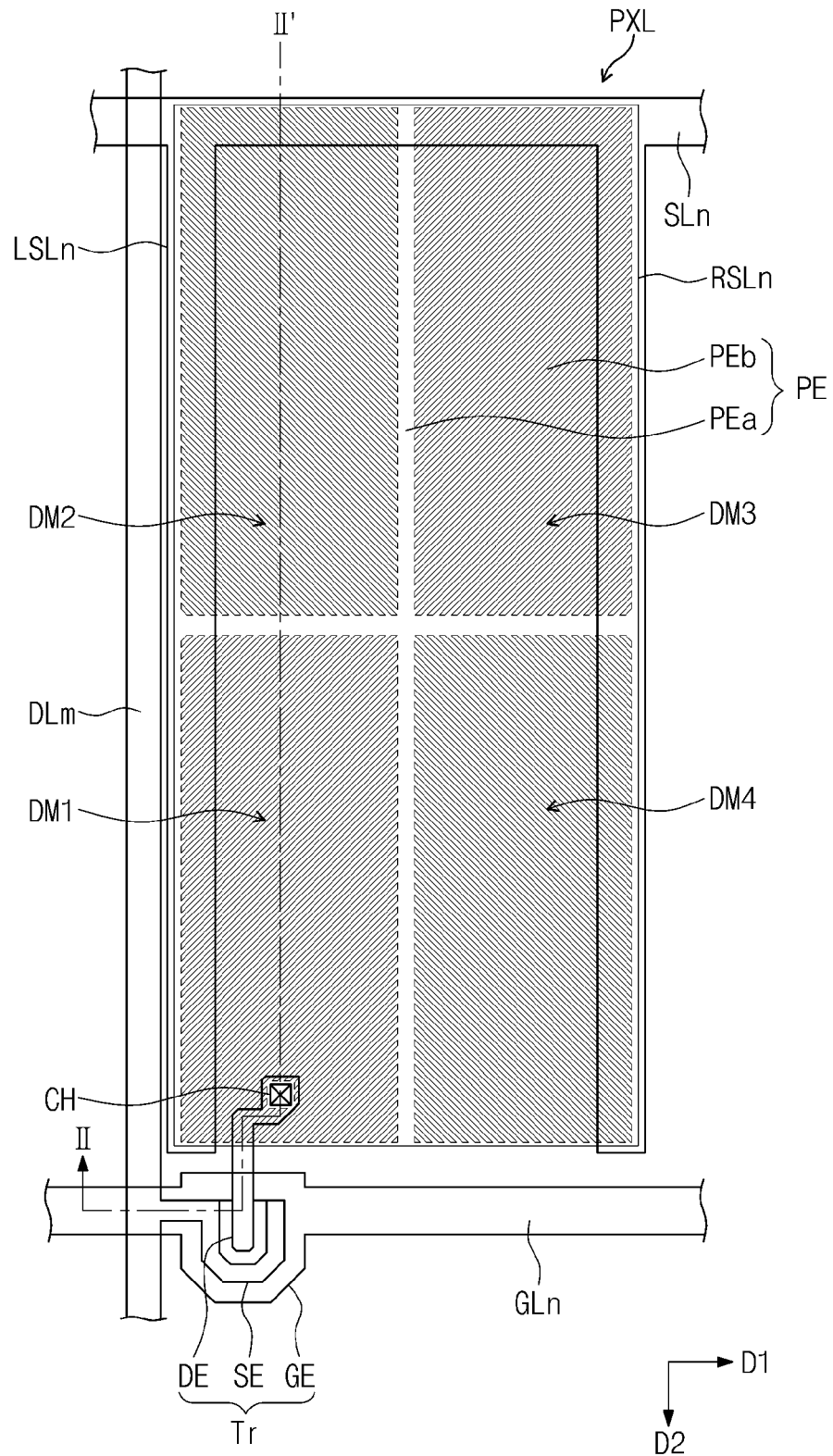
FIG. 3 is a plan view of a portion of a liquid crystal display device according to exemplary embodiments of the present disclosure.

FIG. 3 is a plan view of a portion of a liquid crystal display device according to exemplary embodiments of the present disclosure. FIG. 4 is a cross-sectional view of a portion of a liquid crystal display device taken along a line II-II' in FIG. 3.

For convenience of explanation, different parts, according to exemplary embodiments of the present disclosure, will be mainly described, and descriptions of parts or embodiments already described with reference to FIGS. 1 and 2 may be omitted.

The liquid crystal display device according to exemplary embodiments of the present disclosure may have various pixel structures. In some cases, two gate lines and one data line may be connected to one pixel. In some cases, one gate line and two data lines may be connected to one pixel. One pixel may include two sub pixels to which two different voltages are applied. In this case, high voltage may be applied to one sub pixel, and low voltage may be applied to another sub pixel. The constituting elements in the pixel, for example, a gate electrode, a source electrode, and a drain electrode may be disposed in various suitable manners.

Referring to FIGS. 3 and 4, the liquid crystal display device may include a first substrate SUB1, a second substrate SUB2 facing the first substrate SUB1, and a liquid crystal layer LCL formed between the first substrate SUB1 and the second substrate SUB2.

The first substrate SUB1 may include a first base substrate BS1, a plurality of gate lines GLn, a plurality of data lines DLm, a plurality of pixels PXL, and a first alignment layer ALN1.

Each of the pixels PXL may be connected to a corresponding gate line GLn among the gate lines, and to a corresponding data line DLm among the data lines.

Each of the pixels PXL may include a thin film transistor Tr, a pixel electrode PE connected to the thin film transistor Tr, and a storage electrode part.

The thin film transistor Tr may include a gate electrode GE, a gate insulating layer GI, a semiconductor pattern SM, a source electrode SE, and a drain electrode DE.

On the thin film transistor Tr, a passivation layer PSV may be provided. The passivation layer PSV may cover the source electrode SE, the drain electrode DE, the channel part, and the gate insulating layer GI, and may include a contact hole CH exposing a portion of the drain electrode DE. The passivation layer PSV may be formed by using an insulating material, for example, an organic insulating material or an inorganic insulating material.

The pixel electrode PE may be connected to the drain electrode DE with the passivation layer PSV being disposed therebetween. The pixel electrode PE may partially overlap with the storage line SLn, and the first and second branch electrodes LSLn and RSLn, to form a storage capacitor.

The pixel electrode PE may be connected to the drain electrode DE through the contact hole CH formed in the passivation layer PSV.

The pixel electrode PE may include a stem part PEa, and a plurality of branch parts PEb extruded and extended from the stem part PEa. The stem part PEa or a portion of the branch parts PEb may be connected to the drain electrode DE through the contact hole CH.

The stem part PEa may be provided in various shapes, and may be provided as a cross shape. The pixel PXL may be divided into a plurality of domains by the stem part PEa. Each of the branch parts PEb may correspond to a domain, and each domain may extend in different directions from each other. For example, the pixel may include first, second, third, and fourth domains DM1, DM2, DM3, and DM4. The branch parts PEb may be separated from each other so that adjacent branch parts PEb may not meet, and the branch parts PEb may extend in parallel to each other within the divided area by the stem part PEa.

In the branch parts PEb, adjacent branch parts PEb may be separated by one or more micrometers to align liquid crystal molecules in the liquid crystal layer LCL in a certain angle on a plane parallel to the base substrate.

The pixel electrode PE may be formed by using a transparent conductive material. The transparent conductive oxide may include ITO, IZO, ITZO, or the like.

The first alignment layer ALN1 may be formed on the passivation layer PSV to cover the pixel electrode PE.

The first alignment layer ALN1 may include a base part including a polymer such as polyimide, polyamic acid, polyamide, polyamic imide, polyester, polyethylene, polyurethane, or polystyrene, or a mixture thereof, and a reactive mesogen part having a network shape and connected to the base part as a side chain shape. For convenience of explanation, the first alignment layer ALN1 is illustrated as one layer.

The reactive mesogen part may include a compound including a reactive mesogen, and a difluoro terphenyl compound for controlling the reactivity of the reactive mesogen and/or a polymerization product thereof.

The reactive mesogen may be at least one of the compounds represented by the following Chemical Formula 3.

[Chemical Formula 3]

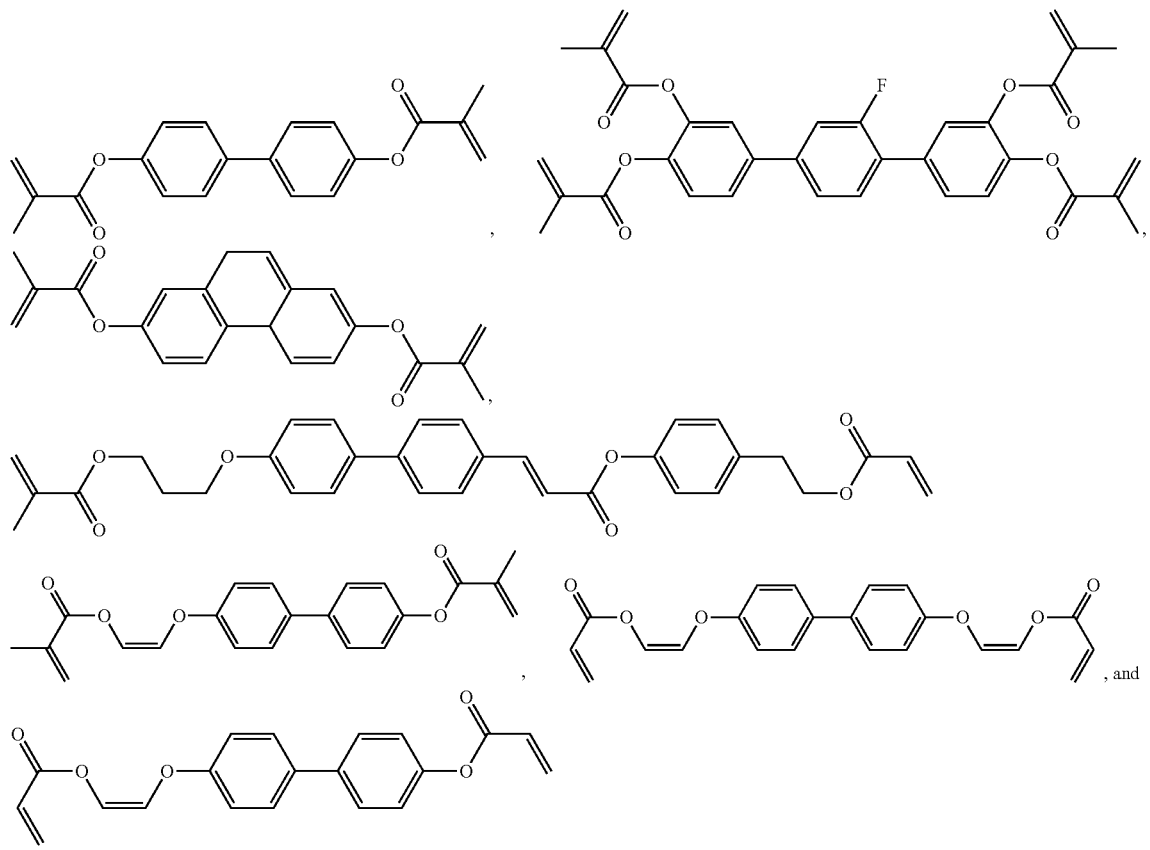

The difluoro terphenyl compound may be represented by the following Chemical Formula 4. The difluoro terphenyl compound may be selected from the compounds capable of absorbing light having similar wavelength as the reactive mesogen. According to the amount of the difluoro terphenyl compound, the reaction degree of the reactive mesogen may be controlled.

[Chemical Formula 4]

R₄ and R₅ may independently represent an alkyl group, an alkenyl group, or an alkoxy group having 2 to 5 carbon atoms.

The first alignment layer ALN1 may include a plurality of areas aligned to correspond to the first, second, third, and fourth domains DM1, DM2, DM3, and DM4 of the pixel electrode PE. The first alignment layer ALN1 may include, for example, first, second, third, and fourth areas, and the liquid crystal molecules may be aligned in corresponding domains DM1, DM2, DM3, and DM4 in different directions from each other.

The second substrate SUB2 may include a second base substrate BS2 on which color filters CF, a black matrix BM, a common electrode CE, and a second alignment layer ALN2 may be formed.

The second alignment layer ALN2 may be formed on the common electrode CE. The second alignment layer ALN2 may be formed on the second substrate SUB2 by using substantially the same material as the first alignment layer ALN1. Thus, a repeated explanation will be omitted.

The liquid crystal layer LCL, including a liquid crystal composition, may be provided between the first substrate SUB1 and the second substrate SUB2. The liquid crystal composition may have negative dielectric anisotropy; however, in some cases, the liquid crystal composition may have positive dielectric anisotropy.

The liquid crystal composition may include the liquid crystal compound represented by Chemical Formula 1 and the liquid crystal compound represented by Chemical Formula 2 from above 0 to about 60 parts by weight based on 100 parts by weight of the total amount of the liquid crystal composition.

In the liquid crystal display device, the thin film transistor Tr may be turned-on if a gate signal is applied to the gate line GLn. The data signal applied to the data line DLm is applied to the pixel electrode PE via the thin film transistor Tr. If the thin film transistor is turned-on, and the data signal is applied to the pixel electrode PE, a perpendicular electric field may be formed between the pixel electrode PE and the common electrode CE. The liquid crystal molecules may be driven by the perpendicular electric field generated due to the voltage difference between the voltages of the common electrode CE and the pixel electrode PE. Thus, the dosage of the light penetrating the liquid crystal layer may be changed, and an image may be displayed.

In a liquid crystal display device according to exemplary embodiments of the present disclosure, the shapes of the pixel electrode PE and the common electrode CE may be changed. The pixel electrode PE is provided to have a plurality of branch parts, but, is not limited thereto. Other shapes of the pixel electrodes PE may be provided without departing from the scope of the present disclosure.

To manufacture the liquid crystal display device of FIGS. 3 and 4 according to exemplary embodiments of the present disclosure, gate lines, data lines, pixels, pixel electrodes may be formed on the first base substrate, and a base part for forming the first alignment layer may be formed on the first base substrate. Separately, a common electrode may be formed on the second base substrate, and a base part for forming the second alignment layer may be formed on the second base substrate. A liquid crystal composition may be disposed between the first substrate and the second substrate. The liquid crystal composition may be exposed to light while applying an electric field to the composition to form the first and second alignment layers.

A description of a method to manufacture the liquid crystal display device of FIGS. 3 and 4 according to exemplary embodiments of the present disclosure is described hereinbelow.

First, a gate pattern may be formed on the first base substrate BS1. On the gate pattern, a gate insulating layer GI may be formed. On the gate insulating layer GI, a semiconductor layer SM may be formed. On the semiconductor layer SM, a data pattern may be formed.

On the data pattern, a passivation layer PSV may be formed. A contact hole may be formed in the passivation layer PSV exposing a portion of the drain electrode DE. The passivation layer PSV may be formed by using a photolithography process.

On the passivation layer PSV, a pixel electrode PE connected to the drain electrode DE through the contact hole CH may be formed. The pixel electrode PE may be formed by using a photolithography process.

On the first substrate SUB1 including the pixel electrode PE thereon, the base part and the reactive mesogen part for the first alignment layer ALN1 may be formed. The base part may be formed by coating a first aligning solution and removing solvents from the first aligning solution. The first aligning solution may include a precursor of a polymer such as polyimide, polyamic acid, polyamide, polyamic imide, polyester, polyethylene, polyurethane, or polystyrene, or a mixture thereof.

On the second base substrate BS2, a color filter CF illustrating color and a black matrix BM may be formed. The black matrix BM may be disposed to block the light leaked out between neighboring pixels. On the color filter CF, a common electrode CE may be formed. The color filter CF and the common electrode CE may be formed by various methods including, for example, a photolithography process.

The base part for the second alignment layer ALN2 is formed on the second substrate SUB2 including the common electrode CE formed thereon. The base part of the second alignment layer ALN2 may be formed by substantially the same method used to form the base part of the first alignment layer ALN1. The material of the second alignment layer ALN2 may be the same as or different from the material of the first alignment layer ALN1.

The first substrate SUB1 and the second substrate SUB2 may face each other, and a liquid crystal layer LCL may be formed between the first substrate SUB1 and the second substrate SUB2.

The liquid crystal composition may include the liquid crystal compound represented by Chemical Formula 1 and the liquid crystal compound represented by Chemical Formula 2 from above 0 to about 60 parts by weight based on 100 parts by weight of the total amount of the liquid crystal composition. In addition, the liquid crystal composition may further include a reactive mesogen and a difluoro terphenyl compound. According to exemplary embodiments of the present disclosure, the liquid crystal composition may include at least one reactive mesogen among the compounds represented by Chemical Formula 3 from above 0 to about 1 part by weight, and at least one compound among the compounds represented by Chemical Formula 4 by from above 0 to about 20 parts by weight.

An electric field and light such as ultraviolet light may be applied to the liquid crystal composition for the reaction of the reactive mesogen and the difluoro terphenyl compound included in the liquid crystal composition to obtain a reactive mesogen part on each of the base parts. Thus, a first alignment layer ALN1 and a second alignment layer ALN2 may be formed.

In more detail, if an electric field is applied to the liquid crystal molecules, the reactive mesogen may be aligned in substantially the same direction as surrounding liquid crystal molecules. If ultraviolet light is incident in this state, the reactive mesogens may be polymerized by the ultraviolet light from each other and may form a network between the reactive mesogens. The reactive mesogens may form a side chain through combining with adjacent reactive mesogens. Since the reactive mesogen forms the network while the liquid crystal molecules are aligned, the reactive mesogen may have specific directional properties along the average aligning direction of the liquid crystal molecules. Thus, the liquid crystal molecules adjacent to the network may have a pretilt angle even though the electric field is removed. The cured reactive mesogen may be additionally cured after removing the electric field.

As described above, the liquid crystal display device may be driven by a mode using the perpendicular electric field. In this case, the rotational viscosity of the total liquid crystal composition may be maintained, and the side reaction due to the double bond of the alkenyl-based liquid crystal compound may be prevented by using the alkenyl-based liquid crystal compound and a cyclohexane-based liquid crystal compound together. Therefore, the liquid crystal display device according to exemplary embodiments of the present disclosure, may accomplish a rapid response time of a pixel by using the low viscosity properties of the liquid crystal compound.

It will be apparent to those skilled in the art that various modifications and variation can be made in the present disclosure without departing from the spirit or scope of the disclosed subject matter. Thus, it is intended that the present disclosure cover the modifications and variations of the disclosed subject matter provided they come within the scope of the appended claims and their equivalents.

What is claimed is:

1. A liquid crystal display device, comprising:
a first substrate comprising a first base substrate and a first alignment layer disposed on the first base substrate;
a second substrate comprising a second base substrate facing the first base substrate, and a second alignment layer disposed on the second base substrate; and
a liquid crystal layer disposed between the first substrate and the second substrate, the liquid crystal layer comprising a liquid crystal composition,
wherein the liquid crystal composition comprises a first liquid crystal compound and a second liquid crystal compound, the first liquid crystal compound comprising at least one compound selected from the group represented by Chemical Formula 1, and the second liquid crystal compound comprising at least one compound selected from the group represented by Chemical Formula 2,
wherein each of the first alignment layer and the second alignment layer comprises at least one reactive mesogen selected from the group represented by Chemical Formula 3 and at least one difluoro terphenyl compound selected from the group represented by Chemical Formula 4, or a polymerization product thereof,
wherein Chemical Formula 1 comprises:

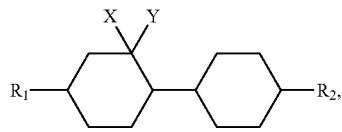

wherein Chemical Formula 2 comprises:

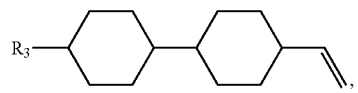

wherein Chemical Formula 3 comprises:

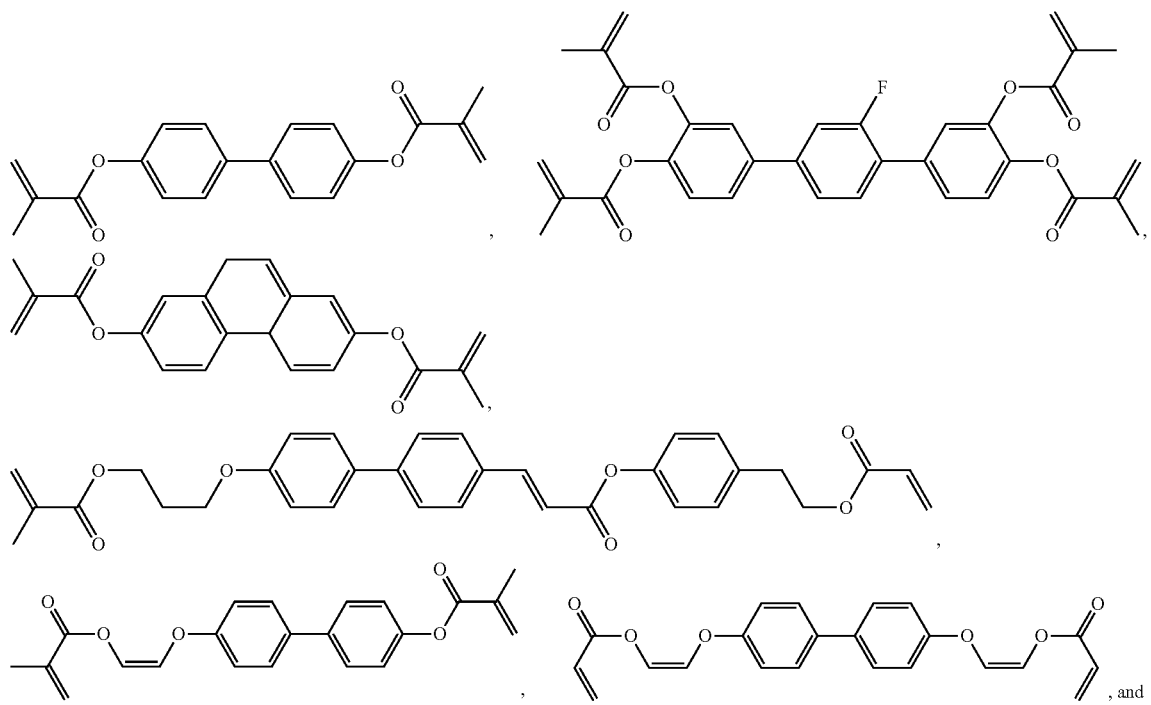

, and

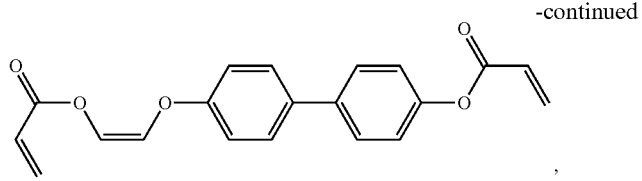

wherein Chemical Formula 4 comprises:

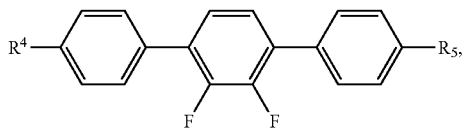

wherein substituents $R_1$ and $R_2$ represent R—, ROCO—, or RCOO—, wherein R comprises an alkyl group having 1 to 15 carbon atoms, the alkyl group comprises an unsaturated or saturated bond, and —$CH_2$— in the alkyl group is substituted or unsubstituted with —O—, —CO—, or —COO—, wherein X and Y independently represent a halogen atom or a hydrogen atom, and do not represent the hydrogen atom at the same time, and wherein $R_3$, $R_4$, and $R_5$ independently represent an alkyl group, an alkenyl group, or an alkoxy group having 2 to 5 carbon atoms.

2. The liquid crystal display device of claim 1, wherein a sum of the first liquid crystal compound and the second liquid crystal compound is from above 0 to about 60 parts by weight based on 100 parts by weight of the liquid crystal composition.

3. The liquid crystal display device of claim 2, wherein an amount of the reactive mesogen is from above 0 to about 1 part by weight.

4. The liquid crystal display device of claim 3, wherein an amount of the difluoro terphenyl compound is from above 0 to about 20 parts by weight.

5. The liquid crystal display device of claim 1, wherein:
the first substrate is disposed between the first base substrate and the first alignment layer, and the first substrate comprises a pixel electrode comprising a stem part and a plurality of branch parts extruded from the stem part; and
the second substrate further comprises a common electrode disposed between the second base substrate and the second alignment layer.

6. The liquid crystal display device of claim 5, wherein an area corresponding to the pixel electrode is referred to as a pixel area, and wherein the stem part divides the pixel area into a plurality of domains, and the branch parts extend in different directions corresponding to each of the domains.

7. The liquid crystal display device of claim 6, further comprising:
a plurality of gate lines extended in a first direction; and
a plurality of data lines extended in a second direction crossing the first direction,
wherein the pixel electrode is coupled to a corresponding gate line among the gate lines and a corresponding data line among the data lines.

8. The liquid crystal display device of claim 7, wherein the branch parts extend in a slanted direction with respect to the first direction or the second direction.

9. A liquid crystal display device, comprising:
a first substrate comprising a first base substrate, a common electrode disposed on the first base substrate, and a pixel electrode insulated from the common electrode;
a second substrate facing the first substrate; and
a liquid crystal layer disposed between the first substrate and the second substrate, and the liquid crystal layer comprising a liquid crystal composition,
wherein the liquid crystal composition comprises a first liquid crystal compound and a second liquid crystal compound, the first liquid crystal compound comprising at least one selected from the group represented by Chemical Formula 1, and the second liquid crystal compound comprising at least one selected from the group represented by Chemical Formula 2, a sum of the first liquid crystal compound and the second liquid crystal compound being from above 0 to about 60 parts by weight based on 100 parts by weight of a total liquid crystal composition,
wherein Chemical Formula 1 comprises:

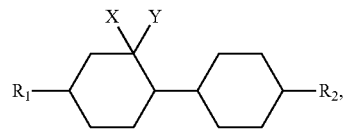

wherein Chemical Formula 2 comprises:

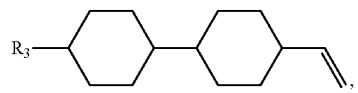

wherein, substituents $R_1$ and $R_2$ represent R—, ROCO—, or RCOO—, wherein R comprises an alkyl group having 1 to 15 carbon atoms, the alkyl group comprises an unsaturated or saturated bond, and —$CH_2$— in the alkyl group is substituted or unsubstituted with —O—, —CO—, or —COO—, wherein X and Y independently represent a halogen atom or a hydrogen atom, and X and Y do not represent the hydrogen atom at the same time, and wherein $R_3$ represents an alkyl group, an alkenyl group, or an alkoxy group having 2 to 5 carbon atoms.

10. The liquid crystal display device of claim 9, wherein at least a portion of the pixel electrode overlaps with the common electrode.

11. The liquid crystal display device of claim 10, wherein one of the common electrode and the pixel electrode is disposed as one plate, and the other one of the common electrode and the pixel electrode comprises a plurality of slits formed by removing a portion of the other one of the common electrode and the pixel electrode.

12. The liquid crystal display device of claim 11, further comprising:
    a plurality of gate lines extended in a first direction; and
    a plurality of data lines extended in a second direction crossing the first direction,
    wherein the pixel electrode is coupled to a corresponding gate line among the gate lines and a corresponding data line among the data lines.

13. The liquid crystal display device of claim 12, wherein the slits extend in a slanted direction with respect to the first direction or the second direction.

14. The liquid crystal display device of claim 9, wherein the first substrate further comprises a first alignment layer disposed between the first base substrate and the liquid crystal layer, and the second substrate further comprises a second alignment layer disposed between the second base substrate and the liquid crystal layer.

\* \* \* \* \*